United States Patent
Belford et al.

(10) Patent No.: US 9,491,288 B1
(45) Date of Patent: Nov. 8, 2016

(54) CALLER IDENTIFICATION FOR RESTRICTED MOBILE DEVICES

(71) Applicant: Hiya, Inc., Seattle, WA (US)

(72) Inventors: Morgan Belford, Seattle, WA (US); William Myron Brooks, Redmond, WA (US); Stephen Orth, Seattle, WA (US)

(73) Assignee: Hiya, Inc., Seattle, WA (US)

( * ) Notice: Subject to any disclaimer, the term of this patent is extended or adjusted under 35 U.S.C. 154(b) by 0 days.

(21) Appl. No.: 14/808,982

(22) Filed: Jul. 24, 2015

Related U.S. Application Data

(60) Provisional application No. 62/170,594, filed on Jun. 3, 2015.

(51) Int. Cl.
  *H04M 3/42* (2006.01)
  *H04W 4/16* (2009.01)
  *H04M 3/436* (2006.01)

(52) U.S. Cl.
  CPC ......... *H04M 3/42059* (2013.01); *H04M 3/436* (2013.01); *H04W 4/16* (2013.01)

(58) Field of Classification Search
  CPC .................. H04M 3/42042; H04M 2207/18; H04M 1/72519; H04M 1/575; H04M 3/42059; H04M 3/436; H04M 4/16; H04W 4/16
  USPC .......................................................... 455/415
  See application file for complete search history.

(56) References Cited

U.S. PATENT DOCUMENTS

| | | | | |
|---|---|---|---|---|
| 5,363,429 A * | 11/1994 | Fujisawa | ............. | H04M 1/2745 379/215.01 |
| 6,253,075 B1 | 6/2001 | Beghtol et al. | | |
| 7,620,160 B2 | 11/2009 | Tidwell et al. | | |
| 8,223,932 B2 * | 7/2012 | Forbes | ............. | H04M 3/42025 379/90.01 |
| 8,626,137 B1 * | 1/2014 | Devitt | ............. | H04M 3/42042 455/414.3 |
| 8,995,976 B2 | 3/2015 | Mian | | |
| 9,060,057 B1 * | 6/2015 | Danis | ............. | H04M 3/42059 |
| 9,100,476 B1 | 8/2015 | Devitt et al. | | |
| 9,106,739 B1 | 8/2015 | Devitt et al. | | |
| 9,154,597 B2 * | 10/2015 | Cook | ............. | H04M 1/663 |
| 2006/0052091 A1 * | 3/2006 | Onyon | ............. | H04L 29/12047 455/415 |
| 2007/0064920 A1 * | 3/2007 | Ruckart | ............. | G06Q 10/109 379/355.07 |
| 2007/0105537 A1 * | 5/2007 | Mahajan | ............. | H04M 3/42034 455/415 |

(Continued)

OTHER PUBLICATIONS

"Avoid Spam Calls with Truecaller," Trueman, True Software Scandinavia AB, Jun. 2, 2010, 4 pages.

(Continued)

*Primary Examiner* — Sharad Rampuria
(74) *Attorney, Agent, or Firm* — Fenwick & West LLP

(57) ABSTRACT

A call information server registers with a carrier platform to receive call notifications for a telephone number associated with a mobile device. When an incoming communication is made to the registered telephone number, the call information server receives a call notification before the incoming communication arrives at the mobile device. The call information server then determines the caller information associated with the caller telephone number. The caller information for the caller telephone number is information about an entity that controls or is otherwise associated with the caller telephone number. The call information server sends the caller information and the caller telephone number to the mobile device before the incoming communication arrives at the mobile device. The mobile device can then display the caller information when the incoming communication arrives at the mobile device.

20 Claims, 6 Drawing Sheets

(56) References Cited

U.S. PATENT DOCUMENTS

| | | | |
|---|---|---|---|
| 2007/0201650 A1 | 8/2007 | Mastro | |
| 2009/0147937 A1* | 6/2009 | Sullhan | H04M 3/42068 379/201.02 |
| 2009/0157732 A1 | 6/2009 | Hao et al. | |
| 2009/0298489 A1 | 12/2009 | Chitturi et al. | |
| 2010/0046729 A1* | 2/2010 | Bifano | H04M 3/42178 379/201.12 |
| 2010/0056117 A1 | 3/2010 | Wolfman et al. | |
| 2010/0198854 A1 | 8/2010 | Chitturi et al. | |
| 2010/0203874 A1 | 8/2010 | Scott et al. | |
| 2011/0014900 A1 | 1/2011 | Gottfried | |
| 2012/0015639 A1* | 1/2012 | Trivi | H04M 3/436 455/415 |
| 2012/0077478 A1 | 3/2012 | Ierullo | |
| 2012/0271946 A1* | 10/2012 | Choti | G06Q 10/0875 709/225 |
| 2012/0276877 A1 | 11/2012 | Balannik et al. | |
| 2012/0324019 A1 | 12/2012 | Ordogh | |
| 2013/0244632 A1 | 9/2013 | Spence | |
| 2013/0310009 A1 | 11/2013 | Jacobstein | |
| 2013/0344849 A1* | 12/2013 | Chatterjee | H04W 4/16 455/413 |
| 2014/0105373 A1* | 4/2014 | Sharpe | H04M 3/4365 379/142.05 |
| 2014/0134972 A1* | 5/2014 | Mian | H04M 3/42093 455/406 |
| 2014/0274171 A1 | 9/2014 | Cooper | |
| 2014/0294167 A1* | 10/2014 | Kim | H04M 1/72519 379/142.17 |
| 2015/0087280 A1* | 3/2015 | Farrand | H04M 3/436 455/415 |
| 2015/0215459 A1 | 7/2015 | Kirchhoff | |
| 2015/0256672 A1* | 9/2015 | Collart | H04W 4/16 455/415 |
| 2015/0271731 A1* | 9/2015 | Backhaus | H04L 65/1069 455/445 |
| 2016/0012465 A1* | 1/2016 | Sharp | G06Q 20/18 705/14.17 |

OTHER PUBLICATIONS

"Truecaller 2.0 for Android is Finally Released! Woohoo!," Trueman, True Software Scandinavia AB, Oct. 19, 2010, 4 pages.

Office Action, U.S. Appl. No. 14/811,771, Oct. 16, 2015, 15 pages.

* cited by examiner

CALLER IDENTIFICATION FOR RESTRICTED MOBILE DEVICES

CROSS-REFERENCE TO RELATED APPLICATIONS

This application claims the benefit of U.S. Provisional Application No. 62/170,594, filed Jun. 3, 2015, which is incorporated by reference herein.

BACKGROUND

1. Field of Art

The present invention generally relates to the field of telephony and specifically to enabling caller identification for restricted mobile devices.

2. Background of the Invention

Users of mobile devices (e.g., cellular phones and tablet computers) can send and receive telephone calls and text messages to and from a wide range of telephone numbers. Many mobile devices are capable of saving and accessing information related to telephone calls and text messages. A mobile device may include an address book that lists contacts stored by a user of the device along with telephone numbers and other information about the contacts. The mobile device may also store a history of telephone numbers corresponding to outbound and inbound calls, and may store a history of sent and received text messages. The user can use this stored information in order to screen incoming communications. However, if additional information about a telephone number of an incoming call is not stored on the user's mobile device, the mobile device often shows only the number of the incoming call. In such a case, the user might not know or recognize the number and therefore have trouble appropriately screening the call.

In addition, some mobile devices have restricted operating systems which block third-party applications from accessing the phone number or other caller information for incoming and outgoing communication involving the mobile device. Thus, it is difficult for third-party applications to provide caller information services on such devices.

SUMMARY

According to embodiments of the invention, a computer-implemented method of enabling caller identification on a mobile device is described. The method includes registering with a carrier platform to receive call notifications for a telephone number associated with a mobile device. The method further includes receiving a call notification from the carrier platform for the registered telephone number indicating that an incoming communication from a caller telephone number has been made to the registered telephone number. The method further includes determining caller information associated with the caller telephone number responsive to receiving the call notification. The method also includes sending the caller information and caller telephone number to the mobile device before the incoming communication arrives at the mobile device.

According to embodiments of the invention, a computer system for enabling caller identification on a mobile device is described. The system includes a computer processor for executing computer program instructions. The system also includes a non-transitory computer-readable storage medium storing computer program instructions executable by the processor to perform steps. The steps include registering with a carrier platform to receive call notifications for a telephone number associated with a mobile device. The steps further include receiving a call notification from the carrier platform for the registered telephone number indicating that an incoming communication from a caller telephone number has been made to the registered telephone number. The steps further include determining caller information associated with the caller telephone number responsive to receiving the call notification. The steps also include sending the caller information and caller telephone number to the mobile device before the incoming communication arrives at the mobile device.

According to embodiments of the invention, a non-transitory computer-readable storage medium storing executable computer program instructions for enabling caller identification on a restricted mobile device is described. The computer program instructions are executable to perform steps. The steps include receiving, at the mobile device, caller information associated with a caller telephone number, the caller information received after an incoming communication is made from the caller telephone number to the mobile device and before the incoming communication arrives at the mobile device. The steps also include storing the received caller information in an entry of an address book of the mobile device, the entry associated with the caller telephone number, wherein an operating system of the mobile device is adapted to automatically display the caller information in the address book entry to a user of the mobile device when the incoming communication arrives at the mobile device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
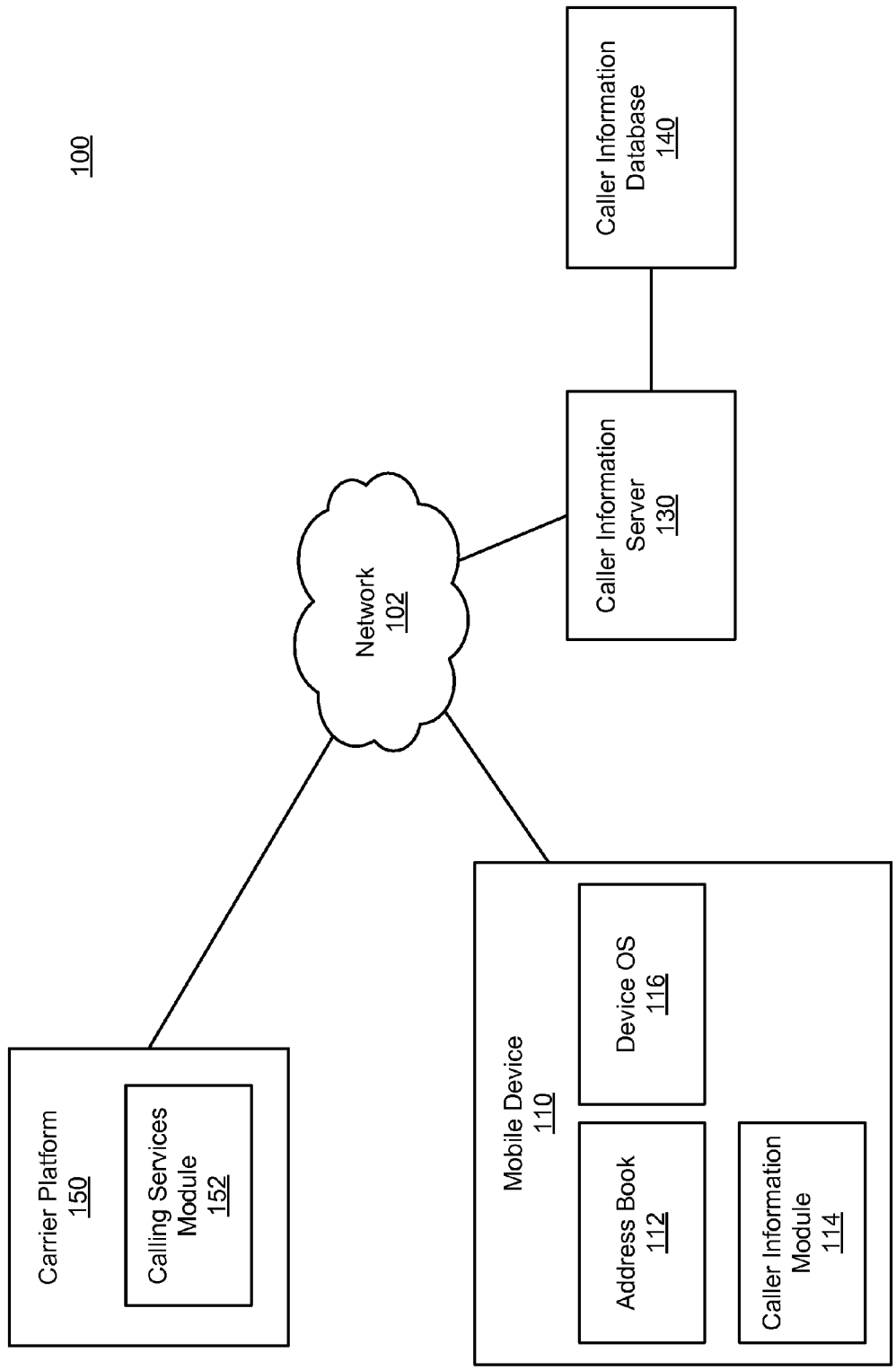
FIG. 1 is a high-level block diagram illustrating an environment for enabling caller identification for restricted mobile devices according to one embodiment.

FIG. 1 is a high-level block diagram illustrating an environment 100 for enabling caller identification for restricted mobile devices according to one embodiment. As shown, the computing environment 100 includes a carrier platform 150, a mobile device 110, and a caller information server 130 connected through a network 102, as well as a caller information database 140. Only one carrier platform 150, caller information server 130, caller information database 140, and mobile device 110 are illustrated in FIG. 1 in order to simplify and clarify the present description. However, embodiments can have millions of mobile devices 110, multiple caller information servers 130, multiple caller information databases 140, and multiple carrier platforms 150. There can be other entities in the computing environment 100 as well.

The network 102 enables communication between the caller information server 130, the mobile device(s) 110, and the carrier platform 150. In one embodiment, the network 102 uses standard communication technologies and/or protocols and can include the Internet as well as mobile telephone networks. Thus, the network 102 can include links using technologies such as Ethernet, 802.11, worldwide interoperability for microwave access (WiMAX), 2G/3G/4G mobile communication protocols, digital subscriber line (DSL), asynchronous transfer mode (ATM), InfiniBand, PCI Express Advanced Switching, etc. Similarly, the networking protocols used on the network 102 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 102 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 102 can use custom and/or dedicated data communication technologies instead of, or in addition to, the ones described above.

The carrier platform 150 is operated by a mobile and/or fixed telephony carrier/provider and provides calling, data, and other telephony services to third parties. The carrier platform 150 may include one or more computing devices communicatively coupled to each other in a network to perform the operations of the carrier platform 150. These operations may include routing calls, routing data, converting data/call protocols, performing billing operations, executing security features, and so on. In some embodiments, the carrier platform 150 uses Voice over Long Term Evolution (VoLTE) technologies, such as the "New Conversation Services" product provided by ALCATEL-LUCENT.

The carrier platform 150 includes a calling services module 152 that provides calling services to third parties for registered telephone numbers. Third parties, via proper authentication and/or security methods, can register with the calling services module 152 for call notifications and to perform call control for communications associated with a registered telephone number. This registered telephone number may be associated with a particular mobile device 110 (e.g., via a subscriber identity module (SIM) card installed in the mobile device or stored within the storage media of the mobile device itself).

The calling services module 152, upon successful registration from a third-party service for a telephone number, may notify the third-party when an incoming communication (e.g., telephone call or text message) is received for the registered telephone number. This notification may be in the form of a message, and may include the caller telephone number, as well as other information about the incoming communication, such as a timestamp, callee telephone number, caller's carrier, type of communication (e.g., text message or phone call), status of communication (e.g., error, disconnection), and so on. The calling services module 152 may also notify the third-party of other types of events such as when a voicemail is left, when an incoming communication is missed, etc. In some cases, the incoming communication may not be identified by a caller telephone number. For example, for a voice call, the incoming telephone number may not be identified if the caller has blocked it. In such a case, the call notification may indicate that the caller telephone number is unknown. Note that although the term "caller telephone number" is used herein, this is meant to generally indicate the telephone number from which a communication originates and is not intended to limit such communications to voice calls only.

The calling services module 152 may also be configured to receive various call control commands from the registered third-party. These call control commands may include commands to delay the incoming communication on the mobile device associated with the registered telephone number by a specified period. Another example of a call control command is a command to block the incoming communication from reaching the mobile device. Yet another example of a call control command is a command to reroute the incoming communication to another telephone number. In some embodiments the calling services module 152 supports additional or different call control commands.

The caller information database 140 is a database associating caller information with telephone numbers. Caller information is information about the entity that controls or is otherwise associated with the telephone number. Generally, caller information is information that cannot be deduced solely from the telephone number itself. Caller information may include but is not limited to: 1) the name of the entity (person or business) associated with the telephone number; 2) an address of the entity; 3) an image related to the entity; 4) a description of the entity; 5) hours of operation of a business entity; 6) other phone numbers associated with the entity; 7) website links and/or email addresses associated with the entity; 8) a business type of the entity; 9) other businesses related to the entity; 10) a spam indicator indicating whether the associated telephone number is associated with nuisance telephone calls (i.e., "spam calls"); and 11) spam score indicating a likelihood that the associated telephone number is associated with nuisance telephone calls. The caller information database 140 may be any form of database, such as a table, a distributed hash table, graph, tree, relational database, or other data structure.

The caller information server 130 interacts with the carrier platform 150 to provide caller information to the mobile devices 110. In some embodiments, the caller information server 130 registers one or more telephone numbers at the carrier platform 150 as described above such that the caller information server 130 receives notifications when incoming communications arrive for any of the registered telephone numbers. Upon receiving a notification of an incoming communication, the caller information server 130 looks up caller information regarding the caller telephone number of the incoming communication using the caller information database 140. In some embodiments, caller information server 130 queries additional sources for caller information in real time, in the case where the caller information database 140 does not have caller information for the caller telephone number. For example, these additional sources may include the Internet, directory server services, reverse phone number services, and so on.

Once the caller information server 130 receives the caller information about the caller telephone number, it provides this information to the mobile device 110 to which the incoming communication is directed. Note that the caller information server 130 receives the caller information after the communication is initiated (e.g., after the call is placed) and provides the caller information to the mobile device 110 before the placed communication arrives at the mobile device 110.

The mobile device 110 is an electronic device that is used by a user to send and receive communications. These communications may include telephone calls, video calls, and data messages between telephone numbers, and other forms of data or voice communications. Examples of a mobile device 110 include a mobile telephone, a portable digital assistant (PDA), and a notebook or tablet computer with telephone and/or other networking functionality. Although this description refers to the devices as "mobile," the devices need not be portable. The phrase "mobile device" can also include a device that is typically stationary, such as a desktop computer.

In one embodiment, the mobile device 110 includes an address book 112 for storing information associated with entities with whom the user of the mobile device communicates. Although only one address book 112 is shown, in other embodiments the mobile device 110 may include multiple address books 112. The information in the address book 112 of a mobile device 110 can be manually entered by the user of the mobile device 110 and/or provided by another source. The information stored in the address book 112 may be similar to the information stored in the caller information database 140. The information in the address book 112 can also include communication records, including call statistics describing communications placed or received by the mobile device 110, such as the associated phone numbers, dates, frequencies and/or durations of calls.

Additionally, the mobile device 110 includes a device operating system (OS) 116 that executes on the mobile device 110 to provide calling and other functionality for the mobile device 110. This functionality includes sending and receiving voice calls and text messages, sending and receiving data, and executing applications. The device OS 116 provides features allowing a user to interface with the mobile device 110 to control the device. Additionally, the device OS 116 provides a platform allowing third parties to develop software applications that execute on the device OS 116 to extend the functionality of the mobile device by using the software and hardware features of the device OS 116 and the mobile device 110.

In some embodiments, the device OS 116 uses the address book 112 to display information about telephone numbers associated with incoming and outgoing communications. For example, the device OS 116 can display the name and picture of a caller to the user using the name and picture stored in the address book 112 for that caller's telephone number. If the address book 112 lacks information about the telephone number, the device OS 116 typically displays only the telephone number.

In some cases, the device OS 116 restricts the types of features and functionality that a third-party software application may access on the mobile device 110. In particular, some device OSs 116 do not allow third-party software applications executing on the mobile device 110 to access information regarding the communication records of the mobile device (e.g., the telephone number of an incoming call, telephone numbers of past calls). An example of such a device OS 116 is the APPLE iOS from APPLE INC. The mobile devices 110 with these device OS 116 restrictions are referred to herein as "restricted mobile devices." Thus, a software application executing on a restricted mobile device 110 is unable to access the communications records on the mobile device 110 in order to provide caller information to the user regarding telephone numbers.

The caller information module 114 executes on the mobile device 110 and provides caller information associated with incoming and outgoing communications involving the mobile device 110. In some embodiments, for an incoming communication, the caller information module 114 receives caller information from the caller information server 130. This information is received after the call or other communication is placed by the caller, but before the communication is received by the mobile device 110. The caller information module 114 places the received caller information in an entry in the address book 112 associated with the caller telephone number of the incoming communication. When the mobile device 110 subsequently receives the incoming communication, the device OS 116 automatically displays the caller information from the address book 112 for the caller telephone number. Thus, the caller information module 114 allows a user to receive caller information regarding the caller telephone number of an incoming communication when using a restricted mobile device 110.

Figure 2:
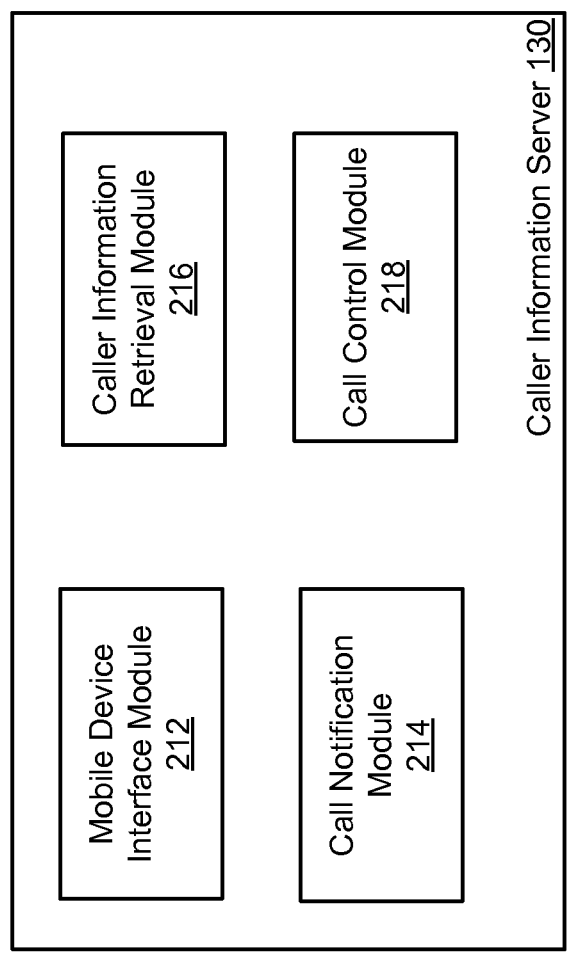
FIG. 2 is a high-level block diagram illustrating a detailed view of the caller information server according to one embodiment.

FIG. 2 is a high-level block diagram illustrating a detailed view of the caller information server 130 according to one embodiment. As shown in FIG. 2, the caller information server 130 includes multiple modules. In some embodiments, the functions are distributed among the modules in a different manner than described herein. Moreover, the functions are performed by other entities in some embodiments.

A mobile device interface module 212 exchanges data with the mobile devices 110, including with the caller information modules 114 executing on the mobile devices. For example, the mobile device interface module 212 may provide caller information to the mobile device 110. As another example, the mobile device interface module 212 may receive an authorization message(s) from a mobile device 110 to register for call notifications with the carrier platform 150. The mobile device interface module 212 may also receive call control requests from the mobile device 110.

The call notification module 214 registers telephone numbers with the carrier platform 150 to receive call notifications and processes the information in the call notifications. In some embodiments, the call notification module 214 receives an authorization message from a mobile device 110 to register a telephone number associated with the mobile device via the mobile device interface module 212. The call notification module 214 then communicates with the carrier platform 150 to register this telephone number for call notifications.

When an incoming communication from a caller telephone number arrives at the carrier platform 150 for a registered telephone number, the carrier platform 150 sends a call notification to the caller information server 130 and the call notification module 214 receives this call notification. In some embodiments, the call notification module 214 sends the caller telephone number identified by the call notification message to the mobile device interface module 212 to send directly to the mobile device 110. In other embodiments, the call notification module 214 sends the caller telephone number to the caller information retrieval module 216.

The caller information retrieval module 216 retrieves caller information for telephone numbers from the caller information database 140. In some embodiments, the caller information retrieval module 216 receives a request to look up information associated with a telephone number from the call notification module 214 after the call notification module 214 receives a call notification for the telephone number from the carrier platform 150. In other embodiments, the caller information retrieval module 216 receives a request from a mobile device 110 to retrieve caller information. This may occur when the caller telephone number for an incoming communication is sent directly to a mobile device 110.

Once the caller information retrieval module 216 receives a request to look up the caller information associated with a telephone number, the caller information retrieval module 216 searches through the caller information database 140 for caller information matching the caller telephone number identified in the request. The caller information retrieval module 216 provides the matching caller information to the requestor.

The call control module 218 communicates with the carrier platform 150 to provide call control functionality for communications involving mobile devices with registered telephone numbers. This call control functionality may include delaying or blocking calls from reaching the called mobile device 110. In one embodiment, the call control module 218 interacts with the carrier platform to delay a communication from reaching a mobile device 110. Thus, if the time used to retrieve the caller information from the caller information database 140 exceeds the time by which the mobile device 110 will receive the incoming communication, the call control module 218 may delay the communication so that the mobile device receives the caller information before it receives the communication. The call control module 218 may delay the incoming communication if, e.g., the time to retrieve the caller information exceeds a threshold value.

In some embodiments, when the spam indicator for a telephone number indicates that the telephone number is a spam number (i.e., is associated with nuisance calls), the call control module 218 may perform call control to block or reroute the incoming communication (e.g., reroute to voicemail). In this embodiment, the call control module 218 analyzes the information received from the caller information database 140 to determine whether the caller information associated with the telephone number includes a spam score. If so, the call control module 218 evaluates the spam score for the telephone number against a threshold. If the spam score meets the threshold, the call control module 218 automatically performs call control to block or reroute the incoming communication and thereby prevent the communication from reaching the mobile device. Further, an embodiment of the call control module 218 may cause the caller information and the caller telephone number to the mobile device 110 to inform the user that a call from the caller telephone number was controlled in this manner. The spam score threshold and whether the call control module 218 blocks or reroutes communications in this way may be configured by users of the mobile devices 110.

In some embodiments, the call control module 218 may receive a request from the mobile device 110 via the mobile device interface module 212 to block or reroute a communication. This causes the call control module 218 to block or reroute the associated communication. A user using an application on a mobile device 110 may configure whether an incoming communication is blocked.

Figure 3:
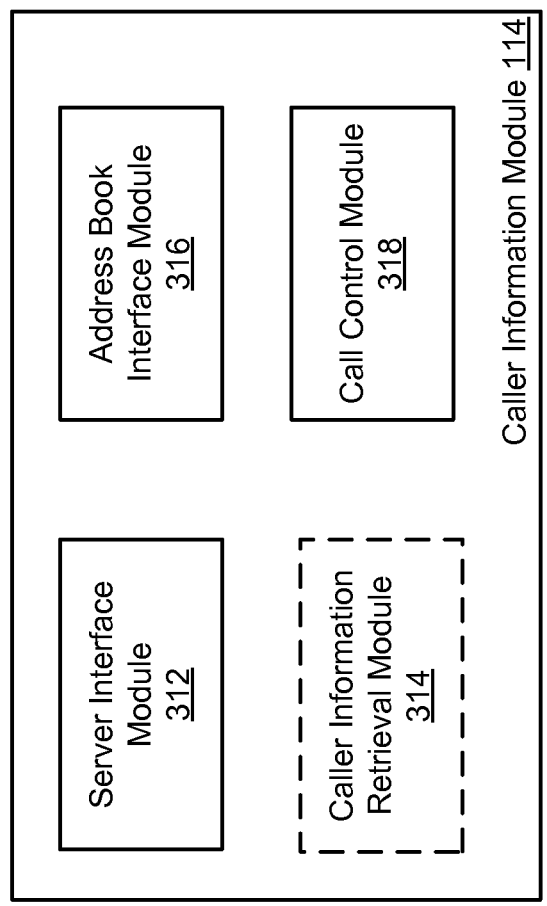
FIG. 3 is a high-level block diagram illustrating a detailed view of the caller information module on the mobile device according to one embodiment.

FIG. 3 is a high-level block diagram illustrating a detailed view of the caller information module 114 on the mobile device 110 according to one embodiment. As shown in FIG. 3, the caller information module 114 includes multiple modules. In some embodiments, the functions are distributed among the modules in a different manner than described herein. Moreover, the functions are performed by other entities in some embodiments.

The caller information module 114 includes a server interface module 312 that exchanges data with the caller information server 130. The exchanged data may include an authorization message that allows the caller information server 130 to register a telephone number associated with the mobile device 110 with the carrier platform 150. The exchanged data may also include caller information received from the caller information server 130 for an incoming communication.

Depending upon the embodiment, the server interface module 312 may receive just the caller telephone number of an incoming communication or both the caller telephone number and the caller information for the number. The server interface module 312 sends the caller telephone number to the caller information retrieval module 314 and/or to the address book interface module 316. In some embodiments, the server interface module 312 also sends call control requests from the mobile device 110 to the caller information server 130 for certain caller telephone numbers.

The caller information retrieval module 314 retrieves caller information for a telephone number. In one embodiment, the caller information retrieval module 314 receives a telephone number for an incoming communication and sends a retrieval request for the caller information associated with the telephone number. The caller information retrieval module 314 may retrieve the caller information by requesting the information from the caller information server 130 via the server interface module 312 or by requesting the information directly from the caller information database 140.

In some embodiments, when the caller information retrieval module 314 receives only the caller telephone number for an incoming communication, the caller information retrieval module 314 may check whether the address book 112 or a local cache of the mobile device 110 already includes caller information regarding the caller telephone number. If so, the caller information retrieval module 314 may send a message to the caller information server 130 (or no message at all) to indicate that no further action is necessary for the associated incoming communication. This process can reduce the number of lookups to the caller information database 140 and save computing resources.

The address book interface module 316 interacts with the address book 112. In some embodiments, after receiving caller information for a caller telephone number from the server interface module 312 and/or the caller information retrieval module 314, the address book interface module 316 creates a new entry or modifies an existing entry in the address book using the caller information. The caller information is entered into the address book 112 in association with the caller telephone number. This way, the device OS 116 automatically displays the caller information for the incoming communication when the communication subsequently arrives at the mobile device 110.

Furthermore, the caller information may be placed in the address book 112 such that the most salient or useful information is shown to the user in a prominent fashion. For example, the name of the entity and a spam score may be placed in subentries in an address book entry for a telephone number such that this information is displayed with a high prominence by the device OS 116. The exact placement of each element in the caller information may depend upon user configuration and the design of the device OS 116.

The address book interface module 316 may remove address book entries from address book 112 when an incoming communication is completed (e.g., the user hangs up, text messages are no longer sent, etc.) or at other times. This removal may be done to save storage space. In some embodiments, the address book interface module 316 maintains a separate address book (e.g., under a different username on the mobile device 110) to store the address book entries that it has created.

The call control module 318 included in the caller information module 114 sends call control requests via the server interface module 312 to the caller information server 130. In some embodiments, once the caller information retrieval module 314 determines the associated caller information for a caller telephone number, the call control module 318 may then send call control requests for that caller telephone number. For example, a user may designate that certain telephone numbers with a spam flag should be blocked so that the call control module 318 sends a call control request to block this number.

Figure 4:
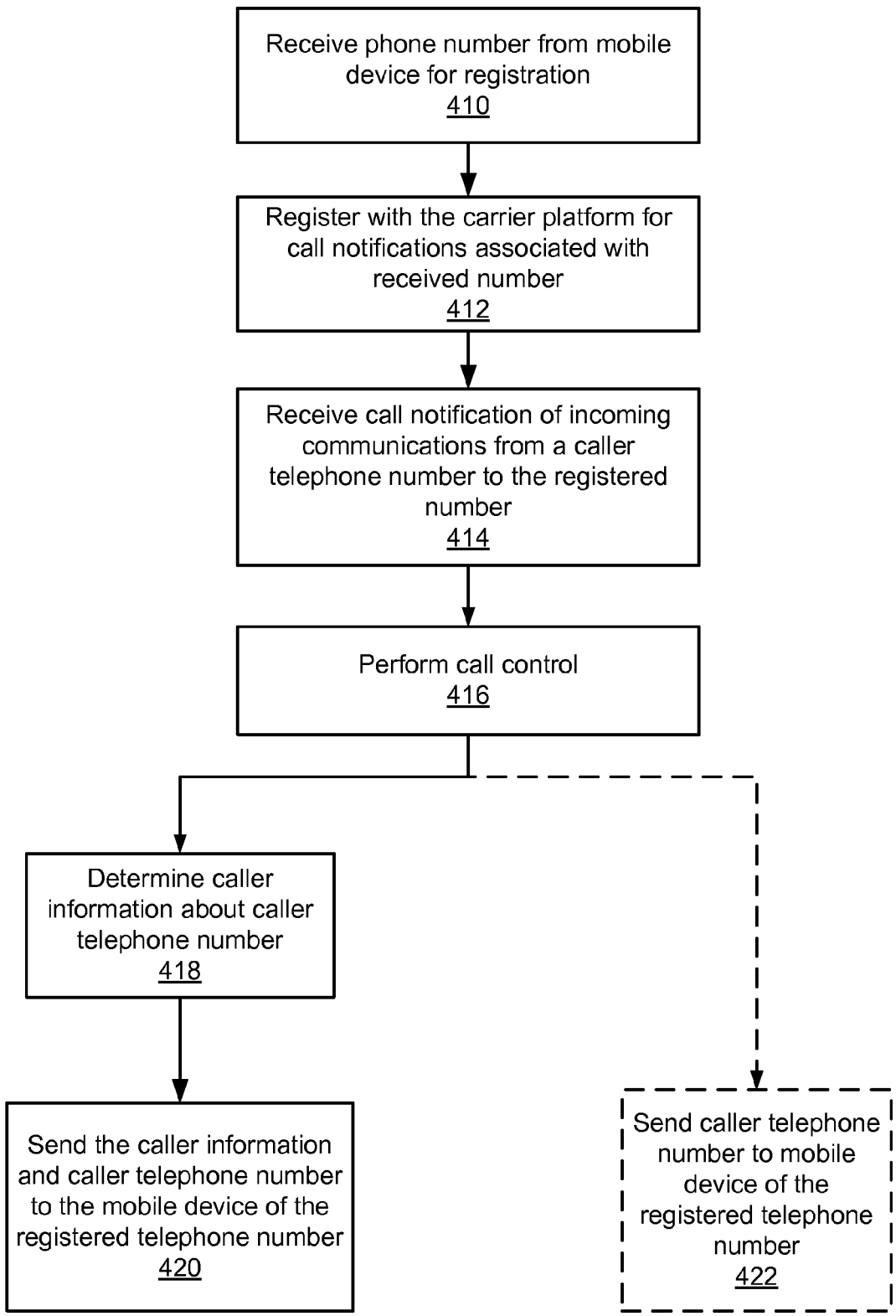
FIG. 4 is a flowchart illustrating a method for enabling caller identification for restricted mobile devices according to one embodiment.

FIG. 4 is a flowchart illustrating a method of enabling caller identification for restricted mobile devices according to one embodiment. In some embodiments, the method is performed by the caller information server 130, although some or all of the operations in the method may be performed by other entities in other embodiments. In some embodiments, the operations in the flow chart are performed in a different order and can include different and/or additional steps.

The caller information server 130 receives 410 a request to register a telephone number associated with a mobile device 110. The caller information server 130 registers 412 this telephone number with the carrier platform 150 in order to receive notifications associated with this number. This registration may be performed using one or more APIs provided by the carrier platform 150.

Subsequently, the caller information server 130 receives 414 a call notification from the carrier platform 150 indicating that an incoming communication was made from a caller telephone number to the mobile device 110 having the registered telephone number. The notification may include the caller telephone number. In some embodiments, the caller information server 130 performs 416 call control for the caller telephone number. For example, the caller information server 130 may delay the incoming communication to allow for time to retrieve the caller information associated with caller telephone number and provide it to the mobile device 110.

The caller information server 130 determines 418 caller information about the caller telephone number. In some embodiments, the caller information server 130 does this by retrieving the caller information from the caller information database 140. After retrieving the caller information regarding the caller telephone number, the caller information server 130 sends 420 the caller telephone number and associated caller information to the mobile device 110. Note that this caller information is sent to the mobile device 110 after the incoming communication is initiated by the caller but before the communication is received by the mobile device 110. This timing allows the mobile device 110 to enter the caller information into the address book 112 before the communication is received at the mobile device 110.

In some embodiments, the caller information server 130 sends 422 the caller telephone number directly to the mobile device 110 without determining the caller information for the caller telephone number. In this case the mobile device 110 may later determine the caller information. This step is illustrated in FIG. 4 using dashed lines to indicate that it is optional and omitted in some embodiments.

Figure 5:
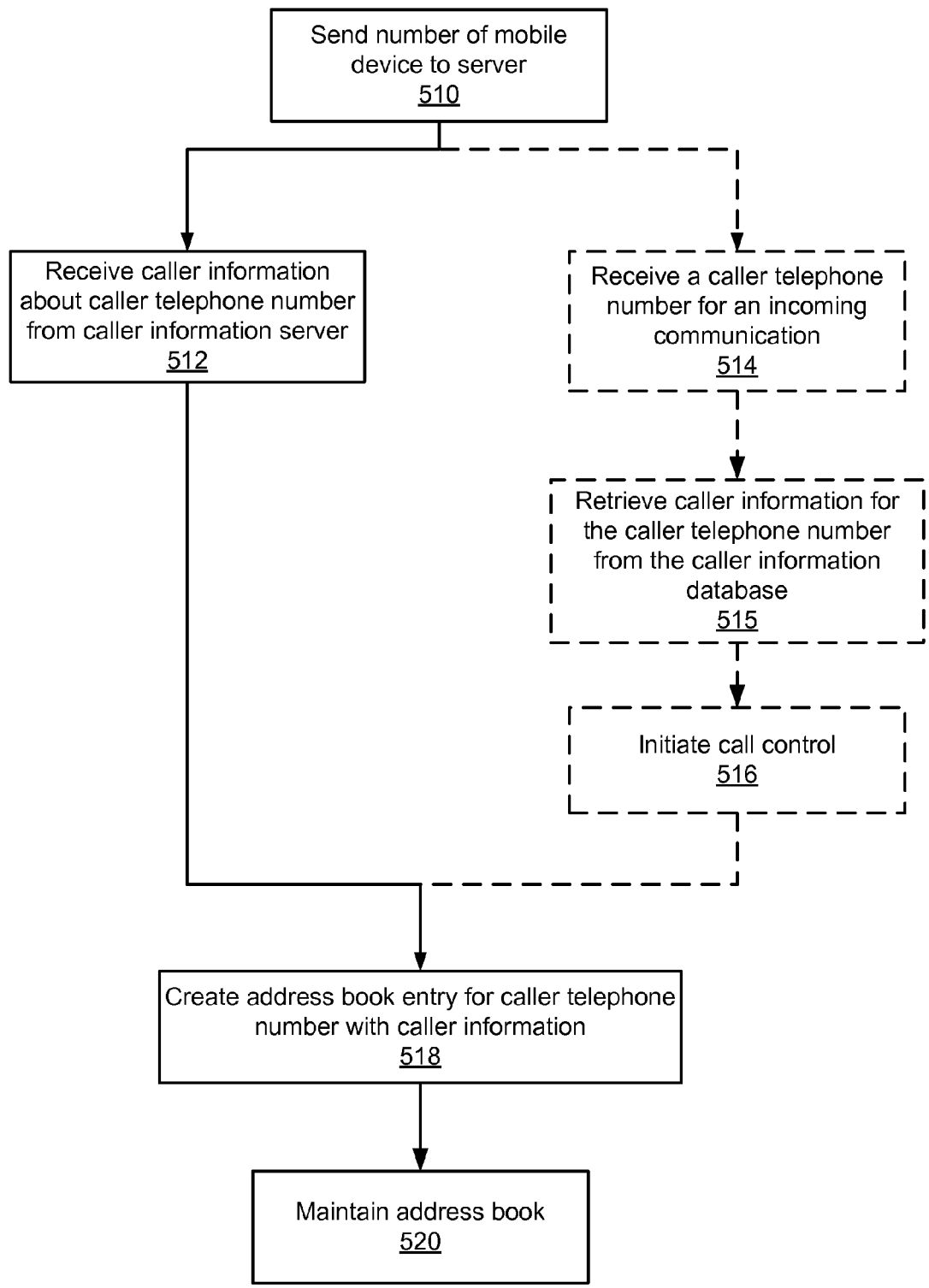
FIG. 5 is a flowchart illustrating a method for enabling caller identification on a restricted mobile device according to one embodiment.

FIG. 5 is a flowchart illustrating a method of enabling caller identification on a restricted mobile device according to one embodiment. In some embodiments, the method is performed by a mobile device 110, although some or all of the operations in the method may be performed by other entities in other embodiments. In some embodiments, the operations in the flow chart are performed in a different order and can include different and/or additional steps.

Initially, the mobile device 110 sends 510 its associated telephone number to the caller information server 130. For example, the mobile device 110 may send the telephone number as part of an explicit instruction to register the telephone number. In one embodiment, the mobile device 110 sends 510 the telephone number to the caller information server 130 only after receiving explicit permission to do so from a user of the mobile device. Thus, the remaining steps of FIG. 5, as well as the corresponding steps of FIG. 4., are performed only with the explicit permission of the user.

Subsequently, the mobile device 110 receives 512 a message from the caller information server 130 identifying a caller telephone number for a communication incoming to, but not yet received by, the mobile device. The message also includes caller information associated with the caller telephone number.

The mobile device 110 creates 518 a new address book entry (or modifies an existing entry) and stores the caller information in association with the caller telephone number in the entry. Once the mobile device 110 receives the incoming communication, the device OS 116 automatically displays the caller information for the caller telephone number to the user of the mobile device 110. This method allows the user to see the caller information even if the mobile device 110 is restricted and the caller information was not stored in the address book prior to when the call was initiated.

After completion of the communication, in some embodiments the mobile device 110 performs various actions to maintain 520 the address book. For example, the mobile device 110 may delete the entry added for the call after the call is completed. As another example, if the user marks the communication as being a nuisance call, the mobile device 110 may modify the address book entry to indicate that the telephone number is associated with spam calls, and may notify the caller information server 130 of this fact.

In some embodiments, the caller information server 130 sends (at 420) the caller telephone number directly to the mobile device 110. In such a case, the mobile device 110 receives 514 this caller telephone number and determines whether caller information for the telephone number is already stored in the address book 112 of the mobile device. If the information is not already stored, the mobile device retrieves 515 the caller information regarding the caller telephone number from the caller information database 140 (optionally via the caller information server 130). Additionally, the mobile device 110 may initiate 516 call control with the caller information server 130 e.g., to delay the incoming communication while it retrieves the caller information.

Subsequently, the mobile device may perform operations similar to those described above.

Figure 6:
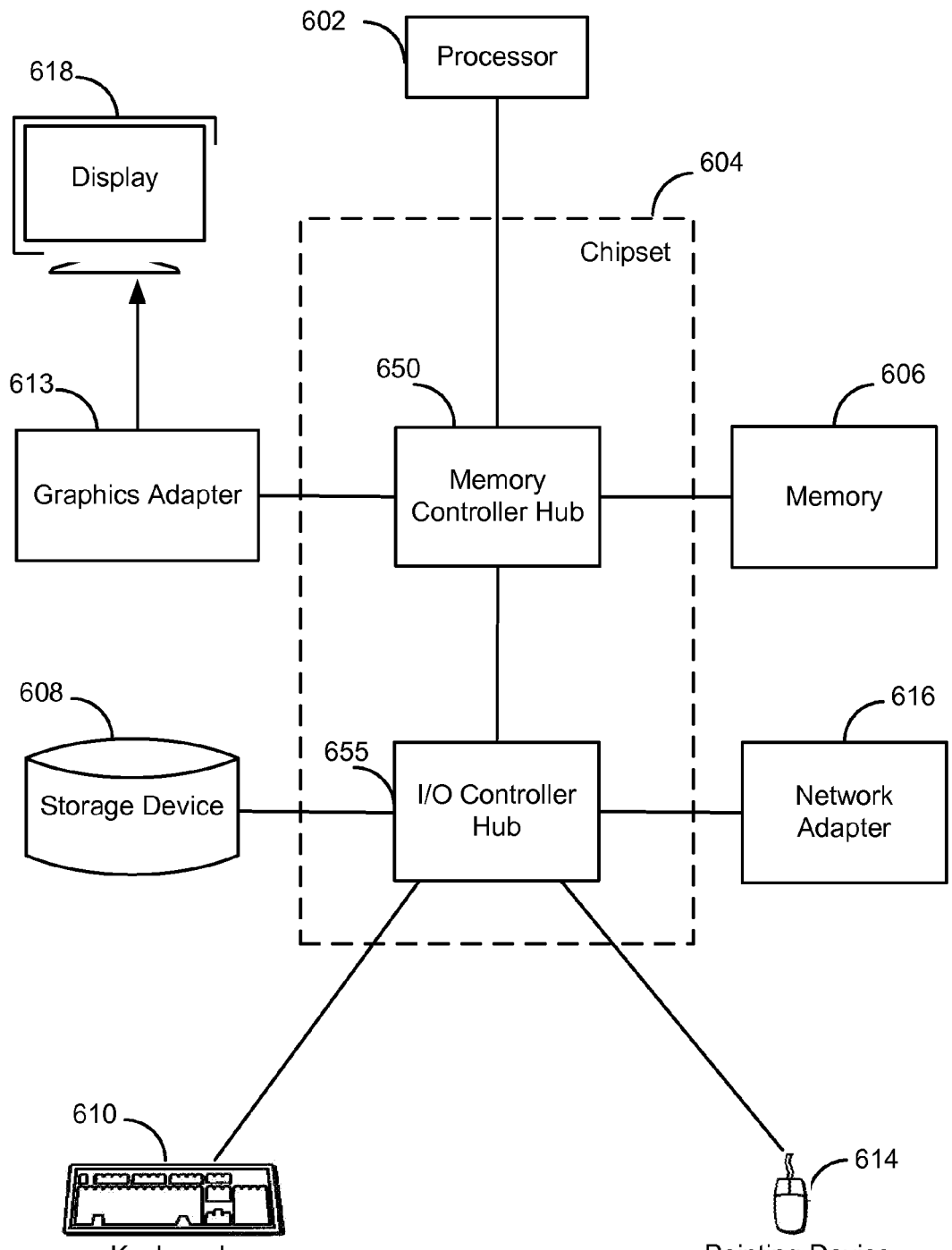
FIG. 6 is a high-level block diagram illustrating an example of a computer for use as a component in a carrier platform, a caller information server, a caller information database, and/or a mobile device according to one embodiment.

FIG. 6 is a high-level block diagram illustrating an example of a computer 600 for use as a component in a carrier platform 150, a caller information server 130, a caller information database 140, and/or a mobile device 110, in accordance with one embodiment. Illustrated are at least one processor 602 coupled to a chipset 604. The chipset 604 includes a memory controller hub 650 and an input/output (I/O) controller hub 655. A memory 606 and a graphics adapter 613 are coupled to the memory controller hub 650, and a display device 618 is coupled to the graphics adapter 613. A storage device 608, keyboard 610, pointing device 614, and network adapter 616 may be coupled to the I/O controller hub 655. Other embodiments of the computer 600 have different architectures. For example, the memory 606 is directly coupled to the processor 602 in some embodiments. As another example, some embodiments of the computer 600 may have different I/O devices, such as a touchscreen, camera, gyroscope, etc.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is used in combination with the keyboard 610 to input data into the computer system 600. The graphics adapter 613 displays images and other information on the display device 618. In some embodiments, the display device 618 includes a touch screen capability for receiving user input and selections. The network adapter 616 couples the computer system 600 to the network 101. Some embodiments of the computer 600 have different and/or other components than those shown in FIG. 6. For example, the carrier platform 150 and/or the caller information server 130 can be formed of multiple blade servers and lack a display device, keyboard, and other components.

The computer 600 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

Upon reading this disclosure, those of skill in the art will appreciate that additional alternative structural and functional designs are possible. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of enabling caller identification on a mobile device, comprising:
   receiving, by a third party caller information server, a call notification from a carrier platform for a telephone number registered with the carrier platform indicating that an incoming communication from a caller telephone number has been made to the registered telephone number;
   determining caller information associated with the caller telephone number responsive to receiving the call notification; and
   sending the caller information and caller telephone number to the mobile device associated with the registered telephone number before the incoming communication arrives at the mobile device.

2. The method of claim 1, further comprising:
   receiving a request from the mobile device to delay an arrival of the incoming communication at the mobile device by a particular time period;
   interacting with the carrier platform to delay the arrival of the incoming communication at the mobile device by the particular time period.

3. The method of claim 1, wherein the mobile device is adapted to add the caller information to an address book of the mobile device, the address book being a separate address book from the default address book of the mobile device, and wherein an operating system executing on the mobile device is adapted to automatically display the caller information in the address book to a user of the mobile device when the incoming communication arrives at the mobile device.

4. The method of claim 1, wherein the incoming communication is a telephone call placed from the caller telephone number to the registered telephone number.

5. The method of claim 1, further comprising:
   registering, by the third party caller information server, to receive call notifications from the carrier platform for the telephone number associated with the mobile device.

6. The method of claim 1, further comprising:
   receiving, by the third party caller information server, an authorization request from the mobile device to register the third party caller information server with the carrier platform to receive call notifications for the telephone number associated with the mobile device.

7. The method of claim 1, further comprising:
   receiving, from the mobile device, a request to block the incoming communication from the caller telephone number;
   interacting with the carrier platform to block the incoming communication from arriving at the mobile device.

8. A non-transitory computer-readable storage medium storing executable computer program instructions for enabling caller identification on a mobile device, the computer program instructions executable to perform steps comprising:
   receiving, at the mobile device, from a third party caller information server, a caller telephone number, the caller telephone number received after an incoming communication is made from the caller telephone number to the mobile device and before the incoming communication arrives at the mobile device;
   accessing an address book of the mobile device to determine whether the address book includes caller information for the caller telephone number; and
   in response to determining that the address book does not include caller information for the caller telephone number:
      retrieving the caller information associated with the caller telephone number from a caller information database; and
      storing the received caller information in an entry of an address book of the mobile device, the entry associated with the caller telephone number;

wherein an operating system of the mobile device is adapted to automatically display the caller information in the address book entry to a user of the mobile device when the incoming communication arrives at the mobile device.

9. The non-transitory computer-readable storage medium of claim 8, wherein the storing comprises storing the received caller information in the entry of the address book after the incoming communication is made from the caller telephone number to the mobile device and before the incoming communication arrives at the mobile device, the address book being a separate address book from the default address book of the mobile device.

10. The non-transitory computer-readable storage medium of claim 8, wherein retrieving the caller information further comprises:
  interacting with the third party caller information server to delay the incoming communication from reaching the mobile device until after the caller information associated with the caller telephone number is retrieved.

11. The non-transitory computer-readable storage medium of claim 8, the steps further comprising:
  deleting the entry associated with the caller telephone number from the address book after the call is completed.

12. The non-transitory computer-readable storage medium of claim 8, wherein the mobile device is a restricted mobile device with a device operating system that prevents third party applications executing on the device operating system from accessing incoming communications records of the mobile device.

13. The non-transitory computer-readable storage medium of claim 8, the steps further comprising:
  accessing a blocked caller list configured by a user of the mobile device;
  in response to determining that the caller telephone number for the incoming communication is in the blocked caller list, transmitting a request to block the incoming communication to the third party caller information server.

14. The non-transitory computer-readable storage medium of claim 13, wherein the blocked caller list includes caller telephone numbers flagged as spam numbers.

15. A computer system for enabling caller identification on a mobile device, comprising:
  a computer processor for executing computer program instructions; and
  a non-transitory computer-readable storage medium storing computer program instructions executable by the processor to perform steps comprising:
    receiving, at the mobile device, from a third party caller information server, a caller telephone number, the caller telephone number received after an incoming communication is made from the caller telephone number to the mobile device and before the incoming communication arrives at the mobile device;
    accessing an address book of the mobile device to determine whether the address book includes caller information for the caller telephone number; and
    in response to determining that the address book does not include caller information for the caller telephone number:
      retrieving the caller information associated with the caller telephone number from a caller information database; and
      storing the received caller information in an entry of an address book of the mobile device, the entry associated with the caller telephone number;
    wherein an operating system of the mobile device is adapted to automatically display the caller information in the address book entry to a user of the mobile device when the incoming communication arrives at the mobile device.

16. The system of claim 15, wherein the storing comprises storing the received caller information in the entry of the address book after the incoming communication is made from the caller telephone number to the mobile device and before the incoming communication arrives at the mobile device, the address book being a separate address book from the default address book of the mobile device.

17. The system of claim 15, the steps further comprising:
  accessing a blocked caller list configured by a user of the mobile device;
  in response to determining that the caller telephone number for the incoming communication is in the blocked caller list, transmitting a request to the third party caller information server requesting to block the incoming communication.

18. The system of claim 15, wherein retrieving the caller information further comprises:
  interacting with the third party caller information server to delay the incoming communication from reaching the mobile device until after the caller information associated with the caller telephone number is retrieved.

19. The system of claim 15, the steps further comprising:
  deleting the entry associated with the caller telephone number from the address book after the call is completed.

20. The system of claim 15, wherein the mobile device is a restricted mobile device with a device operating system that prevents third party applications executing on the device operating system from accessing incoming communications records of the mobile device.

* * * * *